(12) United States Patent
Seleznev et al.

(10) Patent No.: US 7,863,901 B2
(45) Date of Patent: Jan. 4, 2011

(54) APPLICATIONS OF WIDEBAND EM MEASUREMENTS FOR DETERMINING RESERVOIR FORMATION PROPERTIES

(75) Inventors: Nikita Seleznev, Cambridge, MA (US);
Tarek Habashy, Burlington, MA (US);
Austin Boyd, Ridgefield, CT (US)

(73) Assignee: Schlumberger Technology Corporation, Cambridge, MA (US)

( * ) Notice: Subject to any disclaimer, the term of this patent is extended or adjusted under 35 U.S.C. 154(b) by 217 days.

(21) Appl. No.: 12/125,552

(22) Filed: May 22, 2008

(65) Prior Publication Data
US 2008/0290874 A1 Nov. 27, 2008

Related U.S. Application Data

(60) Provisional application No. 60/940,099, filed on May 25, 2007.

(51) Int. Cl.
G01V 3/08 (2006.01)
G01V 3/12 (2006.01)
(52) U.S. Cl. ........................................ 324/337; 324/335
(58) Field of Classification Search ......... 324/334–335, 324/337–339, 345–346; 702/7
See application file for complete search history.

(56) References Cited

U.S. PATENT DOCUMENTS 3,967,190 A 6/1976 Zonge

| | | | |
|---|---|---|---|
| 7,456,632 B2 * | 11/2008 | Johnstad et al. | 324/337 |
| 2005/0134278 A1 * | 6/2005 | Nichols | 324/348 |
| 2007/0061080 A1 | 3/2007 | Zhdanov | |

OTHER PUBLICATIONS

Darocha et al, "Fractal geometry, porosity and complex resistivity from rough pore interface to hand specimens", Development in Petrophysics, Geologica; Society Special Publications No. 122, pp. 287-297, 1997.
Darocha et al, "Fractal geometry, porosity and complex resistivity from rough pore interface to hand specimens", Development in Petrophysics, Geological Society Publications No. 122, pp. 287-297, 1997.
Binley et al, "Relationship betweeen spectral induced polarization and hydraulic properties of saturated and unsaturated sandstone", Water Resources Research, vol. 41, W12417, 13 pages, 2005.
Borner et al, "Evaluatin of transport and storage properties in the soil and groundwater zone from induced polarization measurements", Geophysical Prospecting, vol. 44, pp. 583-601.

(Continued)

*Primary Examiner*—Bot L LeDynh
(74) *Attorney, Agent, or Firm*—Vincent Loccisano; James McAleenan; Brigid Laffey

(57) ABSTRACT

A method for determining reservoir formation properties that consists of exciting the reservoir formation with an electromagnetic exciting field, measuring an electromagnetic signal produced by the electromagnetic exciting field in the reservoir formation, extracting from the measured electromagnetic signal a spectral complex resistivity as a function of frequency, fitting the spectral complex resistivity with an induced polarization model and deducing the reservoir formation properties from the fitting with the induced polarization model.

16 Claims, 16 Drawing Sheets

OTHER PUBLICATIONS

Klein et al, "Electrical properties of artificial clay-bearing sandstone", Geophysics, vol. 47, No. 11, Nov. 1982, pp. 1593-1605.

Snyder et al, "Complex formation resistivity - the forgotten half of the resistivity log", SPWLA 18th Annual Logging Symposium, Jun. 5-8, 1977, Exploration Data Consultants, Inc., 39 pages.

Titov et al, "Theoretical and experimental study of time domain-induced polarization in water-saturated sands", Journal of Applied Geophysics 50 (2002), pp. 417-433.

* cited by examiner

APPLICATIONS OF WIDEBAND EM MEASUREMENTS FOR DETERMINING RESERVOIR FORMATION PROPERTIES

FIELD OF THE INVENTION

The present invention relates to the use of electromagnetic (EM) measurements to determine reservoir formation properties. More particularly, the invention relates to the determination and/or mapping of one or more of the reservoir properties such as wettability, clay content and/or rock texture. The method according to the invention can be applied to any type of EM data including, but not limited to, borehole measurements, cross-well surveys and surface surveys.

BACKGROUND OF THE INVENTION

Hydrocarbon exploration typically involves various geophysical methods to detect the presence of hydrocarbons in the natural void space of the rock (measured as "porosity") or to map structural features in a formation of interest which are capable of trapping hydrocarbons.

To be mapped geophysically, the formation containing the hydrocarbon must possess a physical property contrast that the geophysical method responds to. For example, the electrical conductivity (c,), or its inverse, resistivity (p), is a physical property that can be measured with electrical or electromagnetic (EM) methods. The resistivity of a rock depends strongly on the resistivity of the pore fluid and even more strongly on the porosity of the rock. Typical brine in sedimentary rock is highly conductive. The presence of brine in bulk rock renders the rock conductive.

Hydrocarbons are electrically non-conductive. Consequently, bulk resistivity of a rock is reduced when hydrocarbons are present. In general, different rocks in a given sedimentary section have different porosities, so even in the absence of hydrocarbons, information about the sedimentary section can be determined.

Resistivity is typically measured with a direct current (DC) source that injects current into the ground or with low frequency time varying fields. Alternatively, one may measure the magnetic fields produced by the induced current. Thus, by measuring the magnitude of the induced current or the secondary magnetic fields arising from these, it is possible to infer the conductivity of the earth formation.

Electromagnetic surveys typically make use of the fact that the complex formation resistivity is typically measured as a function of the frequency of excitation signal. The complex formation resistivity can be defined as $\rho=1/\sigma+j\omega\in$, where $\sigma$ is the formation conductivity and $\in$ is the formation dielectric constant.

However, at present the inversion of electromagnetic (EM) surveys (aka Deep Electromagnetic Prospecting) is limited to mapping the real part of the formation resistivity with the aim of inferring the saturation distribution in the reservoir. EM methods are ideal in geologic situations where rocks of greatly different electrical resistivity are juxtaposed.

However, conventional inversion of the deep electromagnetic (EM) surveys is limited to determining and mapping of the real part of the formation resistivity with the aim of inferring the saturation distribution in the reservoir.

One aim of an embodiment of the present invention is to describe a method to use EM prospecting or borehole complex resistivity data to determine petrophysical information regarding an earth formation.

Additional objects and advantages of the invention will become apparent to those skilled in the art upon reference to the detailed description taken in conjunction with the provided figures.

SUMMARY OF THE INVENTION

Preferably, according to a preferred embodiment of the invention, it is provided a method for determining a reservoir formation properties comprising: i) exciting the reservoir formation with an electromagnetic exciting field; ii) measuring an electromagnetic signal produced by the electromagnetic exciting field in the reservoir formation; iii) extracting from the measured electromagnetic signal a spectral complex resistivity as a function of frequency; iv) fitting the spectral complex resistivity with an induced polarization (IP) model and v) deducing the reservoir formation properties the fitting with the induced polarization model.

Preferably, the step of fitting the spectral complex resistivity with an induced polarization model comprises fitting the real and imaginary part of said complex resistivity with said induced polarization model.

Advantageously, the step of fitting the spectral complex resistivity with an induced polarization model comprises fitting the imaginary part of said complex resistivity with said induced polarization model.

Preferably, the reservoir formations properties comprises wettability of the reservoir formation.

Advantageously, the reservoir formation properties comprises one of clay content, rock texture or hydraulic permeability of the reservoir formation.

In a preferred embodiment, the step of exciting the reservoir formation comprises exciting the reservoir formation with an electromagnetic field at a plurality of frequencies.

Preferably the method comprises the step of repeating steps i) to v) for each of the plurality of frequencies in order to produce a map of the reservoir formation properties for a complete region of the reservoir formation.

Advantageously, the method further comprises the step of repeating steps i) to v) for each of the plurality of frequencies in order to produce a map of the reservoir formation properties at multiple depths along a borehole drilled through the reservoir formation.

Preferably, the method further comprises the step of: vi) repeating steps i) to v) at various time intervals; vii) comparing the reservoir formation properties for the various time intervals in order to monitor changes in said reservoir formation properties as a function of time.

Advantageously, the reservoir formations properties comprises wettability of the reservoir formation and wherein the step of comparing the reservoir formation properties for the various time intervals allows to map movement of a flood front into the reservoir formation.

In an advantageous embodiment, it is proposed a computer-implemented method for determining a reservoir formation properties, said method comprising: i) acquiring in a computer software program an electromagnetic signal received from a electromagnetic tool; ii) extracting from the measured electromagnetic signal a spectral complex resistivity; iii) fitting the spectral complex resistivity with an induced polarization (IP) model and iv) deducing the reservoir formation properties the fitting with the induced polarization model.

In yet another advantageous embodiment, it is proposed a method for determining the wettability of a reservoir formation comprising the steps of: i) exciting the reservoir formation with an electromagnetic exciting field; ii) measuring an electromagnetic signal produced by the electromagnetic exciting field in the reservoir formation; iii) extracting from the measured electromagnetic signal a spectral complex resistivity as a function of frequency; iv) extracting the imaginary part from the spectral complex resistivity; v) deducing the wettability of the reservoir formation from said extracted imaginary part.

An embodiment of the present invention explores the interpretation of the imaginary part of the complex formation resistivity for determining, and optionally further mapping one or more of wettability, clay content, rock texture and hydraulic permeability of said formation. Water-wet reservoir rocks show measurable imaginary part of the complex formation resistivity. The imaginary part of the resistivity arises due to several polarization mechanisms commonly referred as the "Induced Polarization (IP) effects". In the non-metallic rocks the IP effect is attributed to the polarization of the double layer and wettability is expected to impact the double layer properties and, consequently, the magnitude of the imaginary part of the resistivity. Therefore, the imaginary part of the complex formation resistivity can be used for wettability mapping.

DETAILED DESCRIPTION

The imaginary part of the complex formation resistivity arises due to the low-frequency polarization effects commonly referred to as "Induced Polarization effects". The induced polarization phenomenon was discovered by Conrad Schlumberger in 1912. It manifests itself in a relatively slow decay of the electric field following the cessation of an excitation current pulse (induced polarization, IP, in the time domain), and in a frequency dependence of the real part of the complex formation resistivity (induced polarization in the frequency domain).

In simple terms, the IP response reflects the degree to which the subsurface is able to store electrical charge, analogous to a capacitor. A number of field parameters were adopted during the development of IP for mineral exploration. These include the time domain chargeability, percentage frequency effect, and the phase angle.

The EM prospecting data is obtained over a wide range of frequencies and it is important to understand its frequency dependence and, if needed, to correct for it. Indeed, if one knows how the complex formation resistivity behaves as a function of frequency then it becomes possible to correct the real part of the resistivity for the dispersion effects that otherwise would be interpreted as a change of the formation resistivity. Also, the analysis of the frequency dependence of the formation resistivity can potentially yield additional information about the probed formation.

Figure 1:
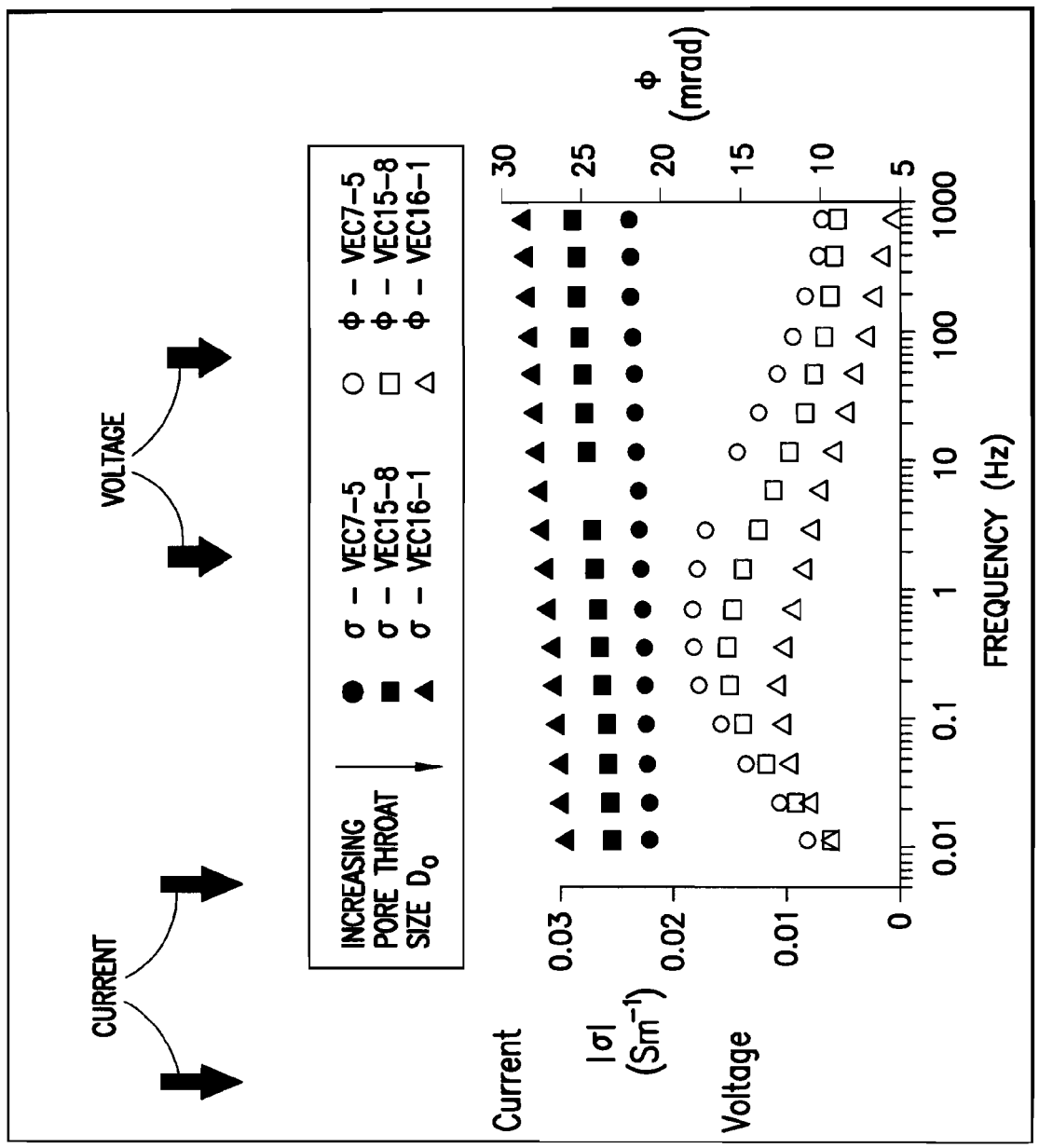
FIG. 1 is a diagram showing the induced polarization effect.

See Lancaster U.: Binley, A., Slater, L. D., Fukes, M. and Cassiani, G., 2005, "Relationship between Spectral Induced Polarization and Hydraulic Properties of Saturated and Unsaturated Sandstone", Water Resources research and FIG. 1. The FIG. 1 is actually a general illustration of the IP effect in time domain and in frequency domain that manifests itself in a frequency dependence of the impedance and the phase angle.

Figure 2:
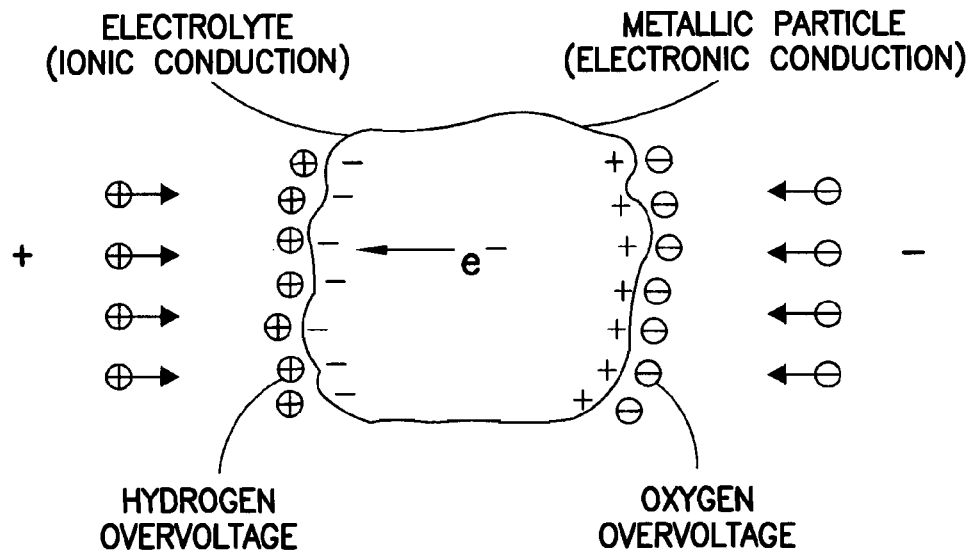
FIGS. 2 and 3 are diagrams showing a cation-selective membrane.
Figure 3:
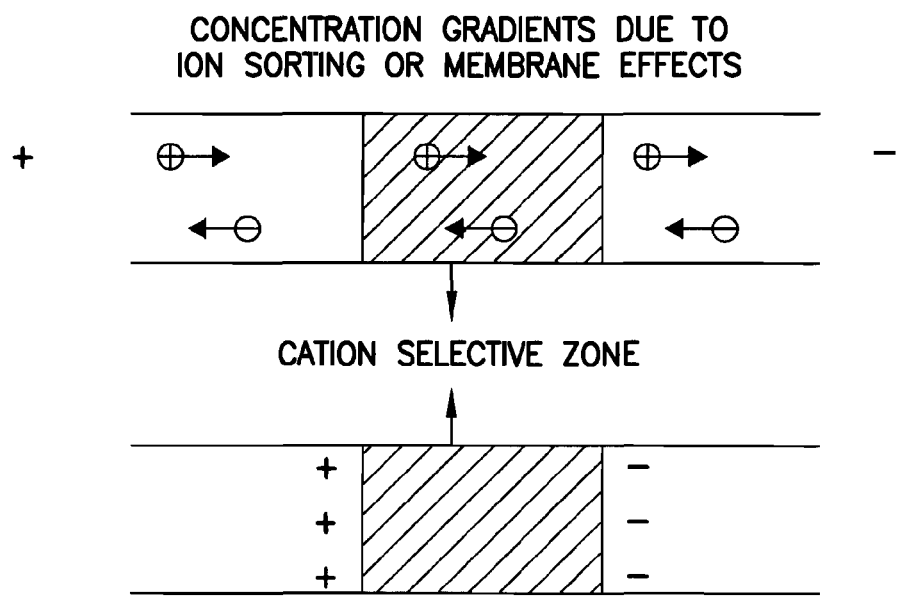

Several physio-chemical phenomena and conditions are responsible for occurrence of the IP effect. Strong IP effect is observed when certain minerals are present (such as pyrite, graphite, some coals, magnetite, pyrolusite, native metals, some arsenides, and other minerals with a metallic lustre). There also is a non-metallic IP effect in rocks that is caused by "ion-sorting" or "membrane effects". For example, FIGS. 2 and 3 show a cation-selective membrane zone 1 and 10 respectively in which the mobility of the cation is increased relative to that of the anion, causing ionic concentration gradients and therefore polarization.

Subsurface polarization results from the presence of interfaces at which local charge concentration gradients develop upon application of electric current. Polarization is enhanced at interfaces associated with metals and clays, but it is also significant and measurable in clay-free and metal-free sediments where it is associated with predominantly tangential ion displacement in the electrical double layer (EDL) forming at the grain-fluid interface. Ionic mobility contrasts at interfaces between wide and narrow pores are also considered a source of polarization enhancement in sandy sediments.

Figure 4:
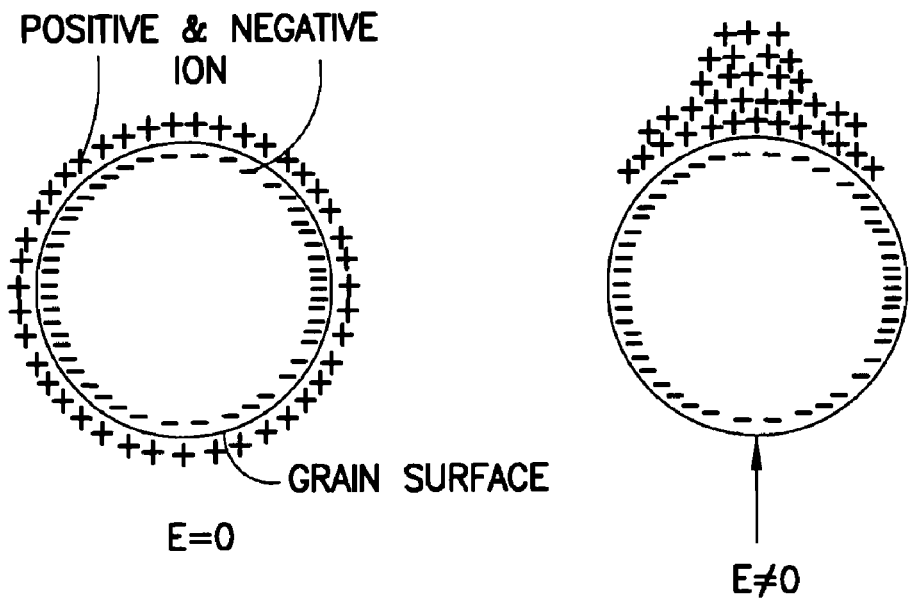
FIGS. 4 and 5 are diagrams showing a Granular Model and a Capillary Model respectively.

There are two main types of the ion-selective models explaining the origin of the non-metallic IP effect. It has been argued that dominant relaxation time of the polarization is controlled by the grain size as depicted in FIG. 4. In this approach, also referred to as "Granular Model", the relaxation time of the induced charge is proportional to the square of the particle radius and inversely proportional to the diffusion coefficient.

The Granular Model may be described in equation (1):

$$\tau = \frac{R^2}{2D} \quad (1)$$

where D is the ion diffusion coefficient and R is the particle radius.

Figure 5:
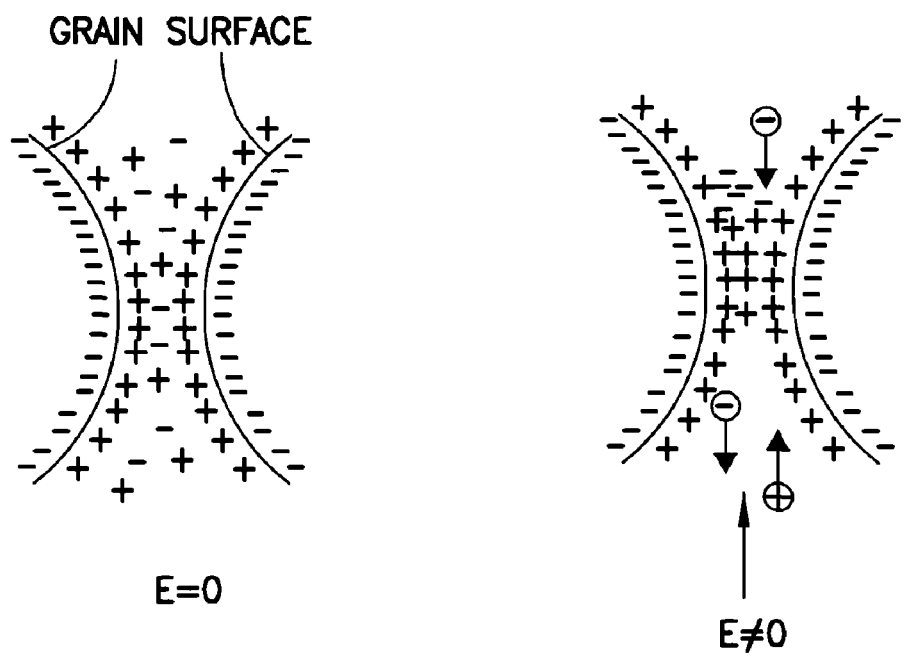

The second ion-selective model, the "Capillary Model", can be formulated in terms of interfaces between ion-selective pore-throats and larger pores, relating the IP mechanism to pore-throat size (shown on FIG. 5). In this model the relaxation time is proportional to the square of the length of the ion-selective zone and inversely proportional to the diffusion coefficient, as described in equation (2)

$$\tau = \frac{l^2}{4D} \quad (2)$$

where l is the length of the pore throat and D is the diffusion coefficient.

Figure 6:
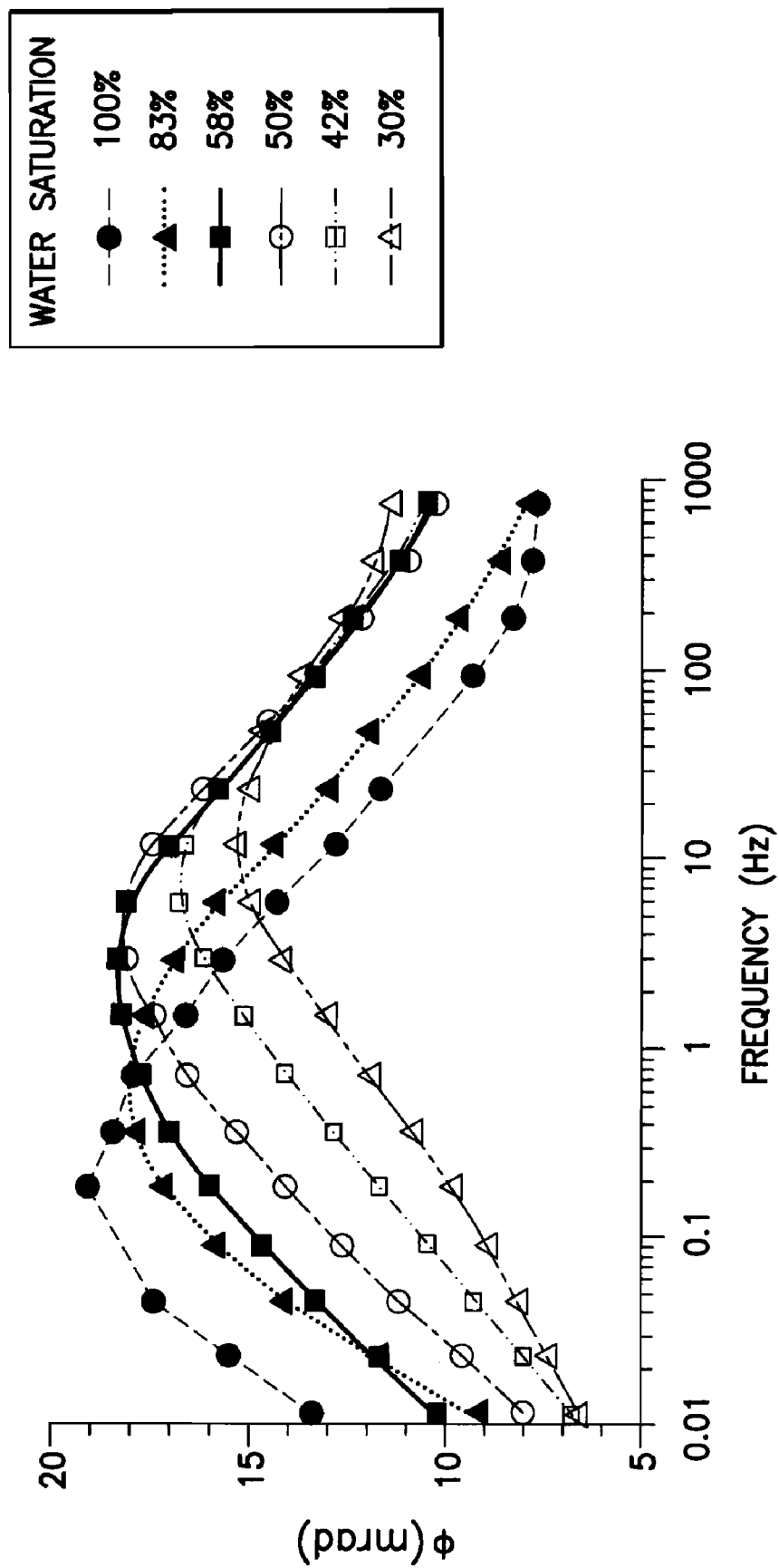
FIG. 6 is a graph showing frequency versus phase ($\Phi$) for sample of varying brine saturations.

Even at low water saturation, reservoir rocks can possess a measurable imaginary part of the complex resistivity (i.e., a measurable phase angle). As shown in FIG. 6, laboratory data shows dependence of the phase angle on water saturation. The magnitude of the phase angle peak is unchanged with saturation, as can be seen from 100%, 83%, 58%, 50%, 42% and 30% water saturation curves, but the peak frequency changes. (See also Lancaster et al. (2005)).

This suggests that even oil-bearing sections of water-wet reservoirs have non-vanishing imaginary part of the complex receptivity.

Figure 7:
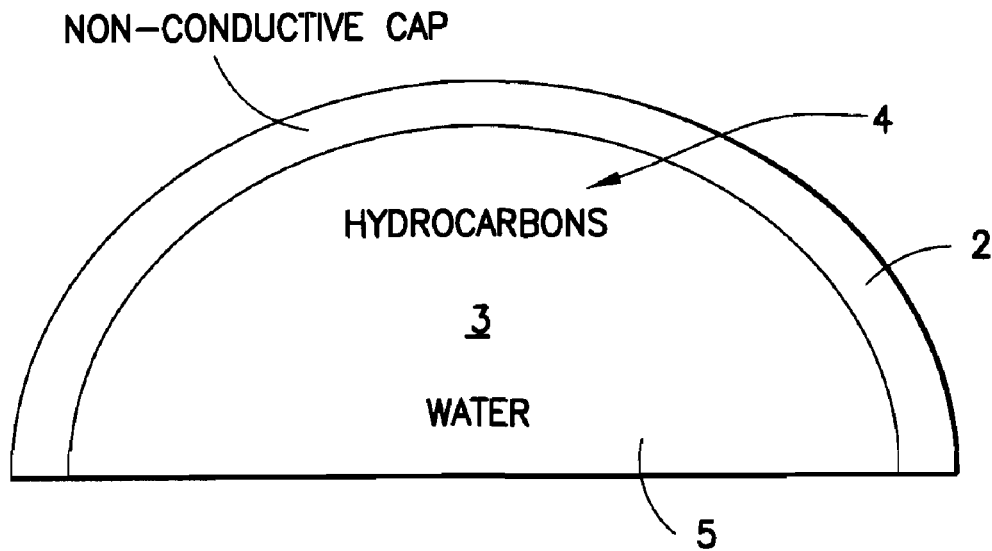
FIG. 7 is a diagram of a hypothetical anticline trap forming an oil reservoir and shows the real part of the complex resistivity.

The origins of the IP effect in ion-conductive rocks and the existence of the IP effect at partial saturations suggests that the IP effect can be used, according to one embodiment of the method of the invention, as an indicator of wettability of the formation. IP effect in ion-conductive media arises due to polarization of the double layer. The wettability is expected to influence the properties of double-layer and therefore the magnitude of the IP effect. In water-wet reservoirs, the imaginary part of the formation resistivity will still be present. By contrast, in oil-bearing sections of the oil-wet reservoirs the imaginary part of the complex resistivity should vanish in hydro-carbon-bearing zones. FIG. 7 shows a hypothetical anticline trap forming an oil reservoir. The non-conductive tight rock layer 2 forms a cap of the reservoir 3. FIG. 7 displays the profile of the real part of the complex formation resistivity. Resistive layers include cap 2 and hydrocarbon bearing zone 4, which are shown in darker areas. The transition zone and the water leg are shown in light grey area 5.

Figure 8:
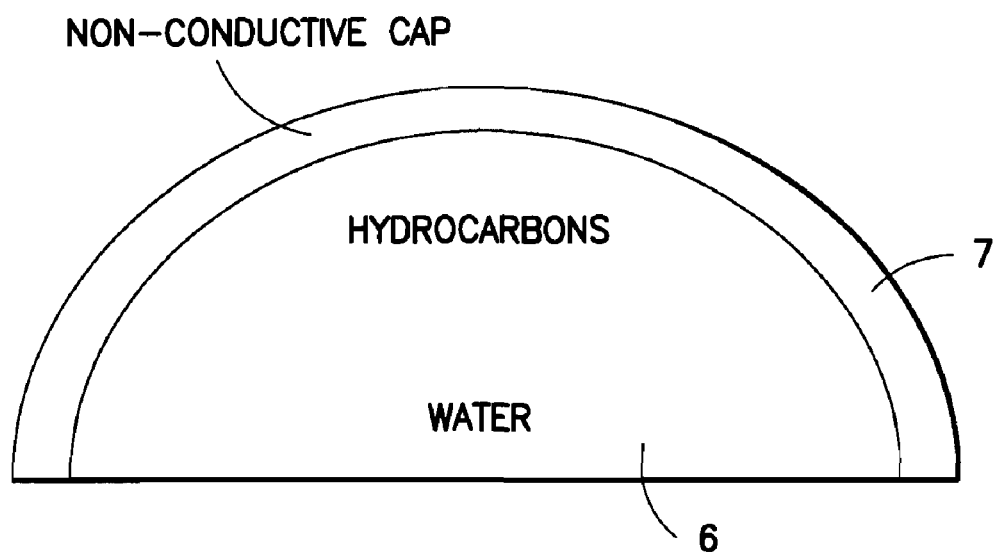
FIG. 8 is a diagram of a hypothetical anticline trap forming an oil reservoir and shows the imaginary part of the complex resistivity for a water-wet reservoir.

The wettability is expected to influence the properties of double-layer and therefore the magnitude of the IP effect. FIG. 8 shows the profile of the imaginary part of the complex formation resistivity for a water-wet reservoir. The imaginary part is non-vanishing in both water-filled and the hydrocarbon-bearing part. The light color zone 6 corresponds to the non-zero imaginary part of the resistivity and the dark color zone 7 outlines vanishing formation resistivity.

Figure 9:
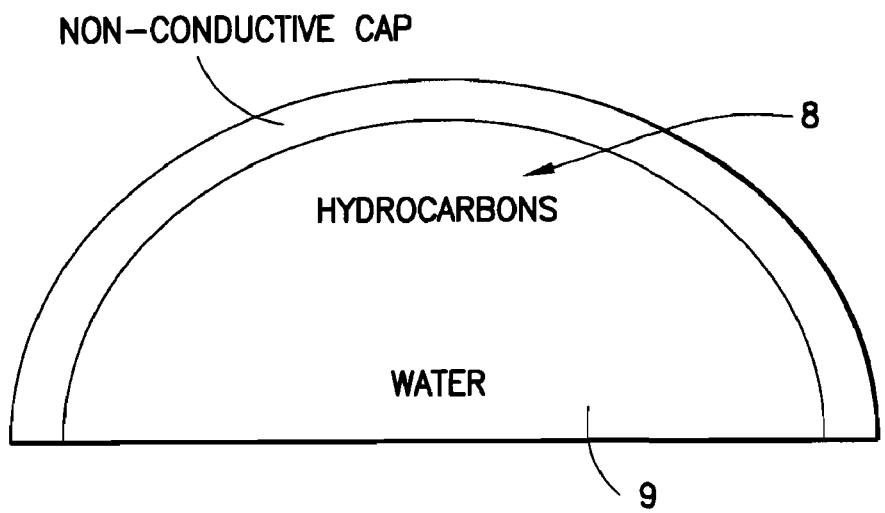
FIG. 9 is a diagram of a hypothetical anticline trap forming an oil reservoir and shows the imaginary part of the complex resistivity for an oil-wet reservoir.

FIG. 9 shows the profile of the imaginary part of the complex formation resistivity for an oil-wet reservoir. The imaginary part vanishes in the oil-wet hydrocarbon-bearing zone 8. The lower water-filled section 9 remains water-wet and displays measurable complex part of the formation resistivity.

Figure 10:
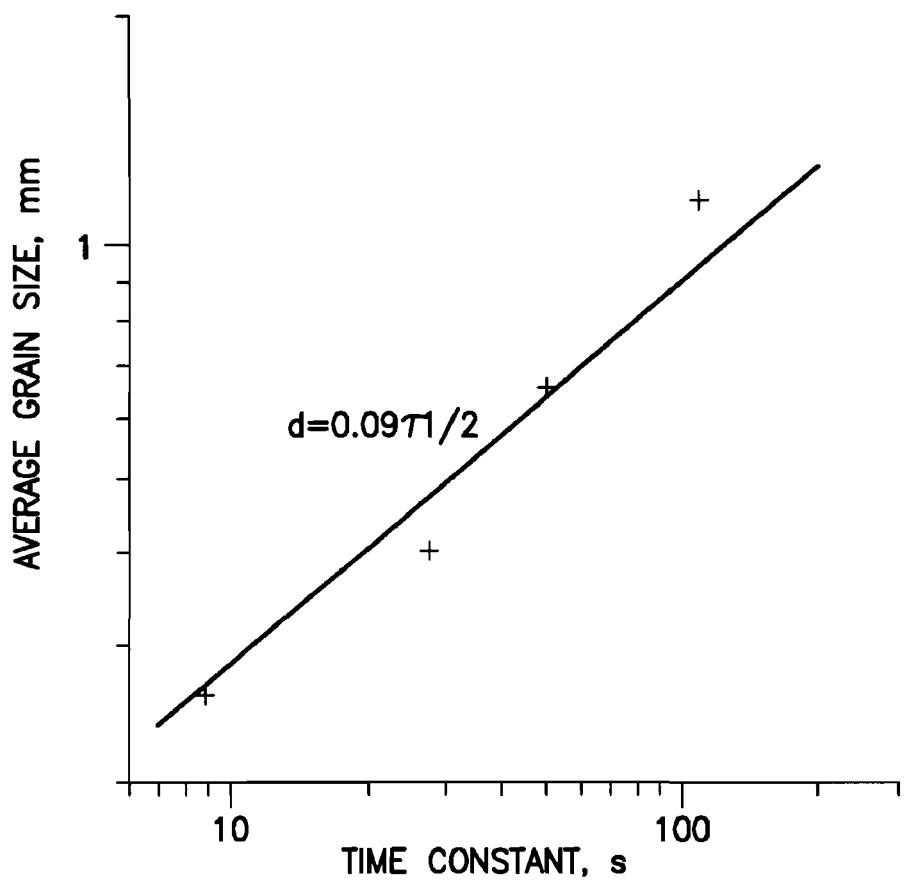
FIG. 10 is a graph of time constant versus average grain size.

According to another embodiment of the method of the invention, IP effects may also be used to determine and map the rock texture of a formation. Time-domain IP measurements were experimentally obtained on a collection of sieved sands with different grain sizes. FIG. 10 shows correlation between relaxation time of the IP effect and the average grain size (or rock texture for sandstones): crosses are experimental data, solid line is an approximate theory (See St. Petersburg U.: Titov, K, Komarov, V, Tarasov. V, and Levitski, A., 2002, *"Theoretical and Experimental Study of Time-Domain Induced Polarization in Water-Saturated Sands"*, J. of Applied Geophysics, vol. 50, pp. 417-433).

Figure 11:
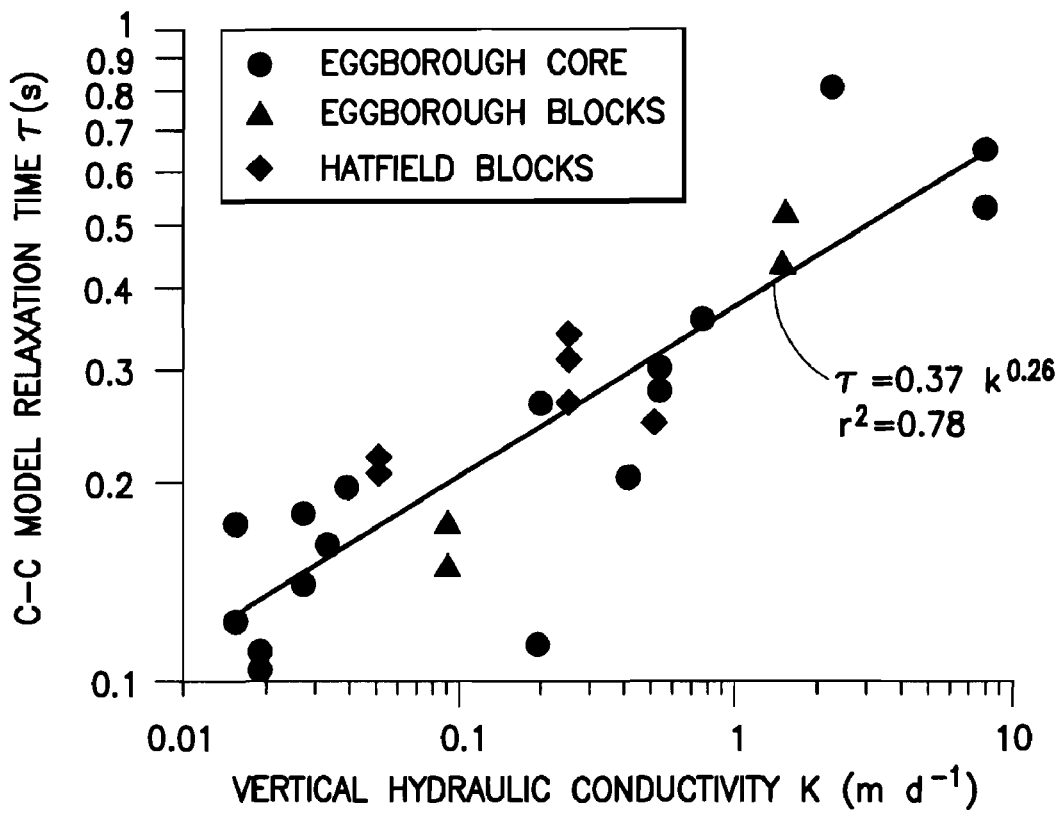
FIG. 11 is a graph of vertical hydraulic conductivity versus Cole-Cole relaxation time.

According to another embodiment of the method of the invention, IP effect may be used to determine and map hydraulic permeability. IP spectra at full water saturation for various sandstones were fitted with the empirical Cole-Cole model. The correlation between the characteristic relaxation time, τ, in the Cole-Cole model and hydraulic conductivity, κ, is shown in FIG. 11. (See Binley, A., Slater, L. D., Fukes, M. and Cassiani, G., 2005, *"Relationship between Spectral Induced Polarization and Hydraulic Properties of Saturated and Unsaturated Sandstone"*, Water Resources research, vol. 41, W12417).

Figure 12:
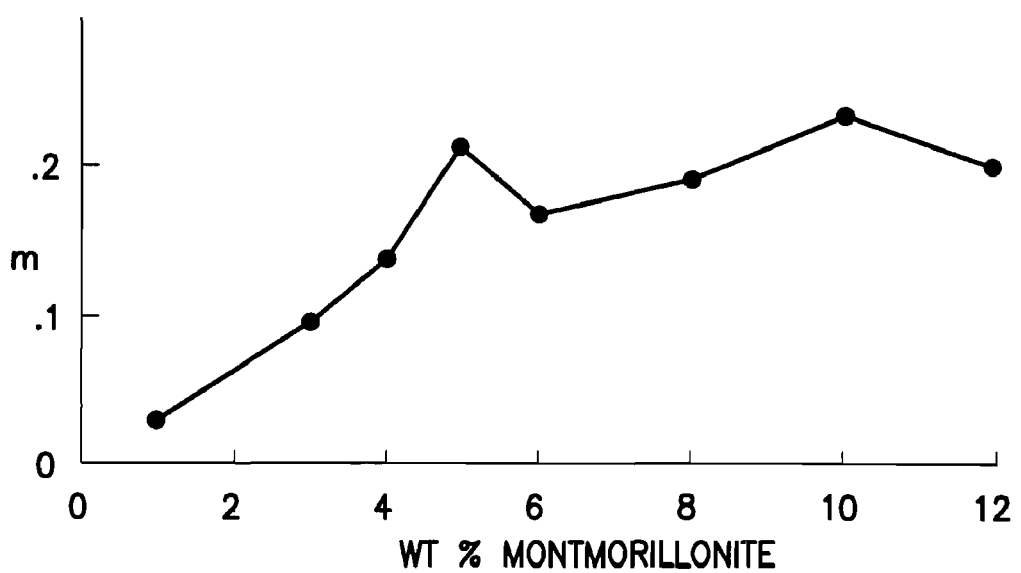
FIG. 12 is a graph of weight percent of montmorillonite versus chargeability.

IP effect may also be used to determine clay content and for clay content mapping. FIG. 12 is a summary of a laboratory investigation of the electrical properties of artificial mixtures of glass beads and clay (Ca-montmorillonite) (See U. of Utah: Klein, J. D., and Sill, W. R., 1982, *"Electrical Properties of Artificial Clay-Bearing Sandstones"*, Geophysics, vol. 47, No. 11, pp. 1593-1605). Samples shown here were saturated with 0.003 molar NaCl. Generalized Cole-Davidson model was used to fit the experimental IP data. Dependence of chargeability on dry weight percent of the clay is observed in this data.

In order to be able to interpret the field EM prospecting data for wettability, textural parameters and Cation Exchange Capacity (CEC) and to correct the real part of the formation resistivity for the IP effects a general IP model (a general complex resistivity formation model) applicable to a wide variety of formations might be necessary. Such a model is described in Da Rocha, B. R., and Habashy, T. M., 1997, *"Fractal Geometry, Porosity and Complex Resistivity: from Rough Pore Interface to Hand Specimens"*, Developments in Petrophysics, Geological Soc. Special Pub. No. 122, pp. 277-286, herein incorporated by reference in its entirety, and is graphically shown in FIG. 13. The model is considered to be general and it encompasses some other commonly used models as special cases.

This general complex resistivity model developed by Tarek Habashy et al has been shown to adequately describe complex resistivity response of a wide variety of rocks (which other models, like Cole-Cole, are lacking) and, therefore, is a preferred candidate for the inversion of the field EM data. A database developed for the model parameters for common oilfield and sedimentary formations can be used to correct the mapping of the real part of the formation resistivity for the IP effect. Analysis of the spectra of the complex formation resistivity over the range of prospecting frequencies can yield additional petrophysical information. Correlation exists between the characteristic relaxation time of the IP and the characteristic pore throat size. Also, the chargeability is proportional to the formation cation exchange capacity.

Interpretation of the complex formation resistivity among other quantities yields the "characteristic relaxation time" that is indicative of the time scale of the IP effects. This time correlates with textural properties of the rocks such as pore throat size. The pore throat size is what mainly controls hydraulic permeability. Chargeability is another parameter obtained from the analysis of the complex formation resistivity spectra. It is related to the magnitude of the IP effect and strongly correlates with clay content.

Analysis of the complex formation resistivity can be used to map these petrophysical parameters.

Figure 13A:
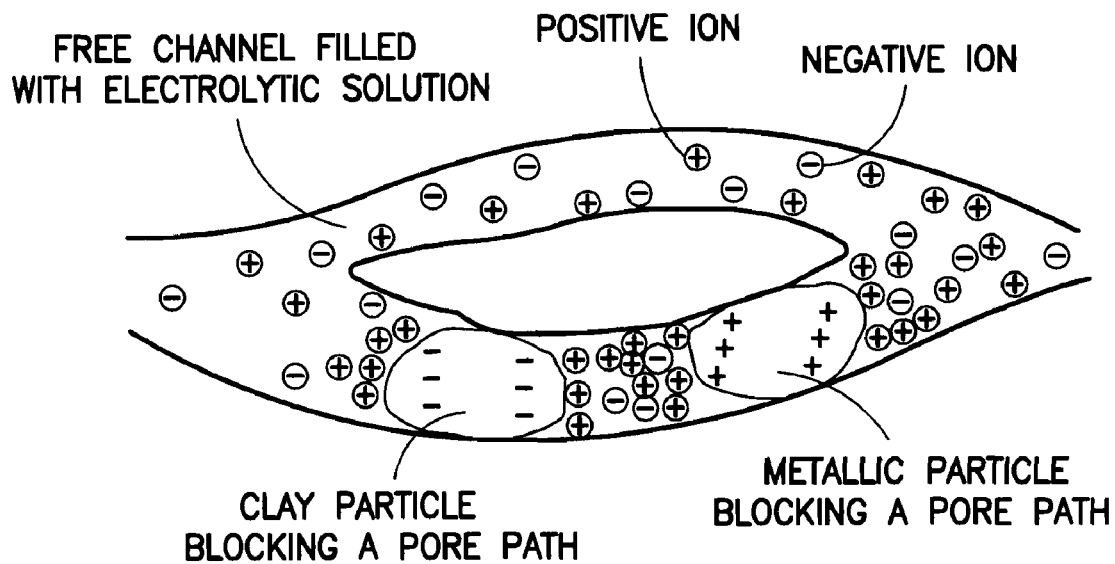
FIG. 13 is a diagram showing a complex resistivity model for geophysical inversion.
Figure 13B:
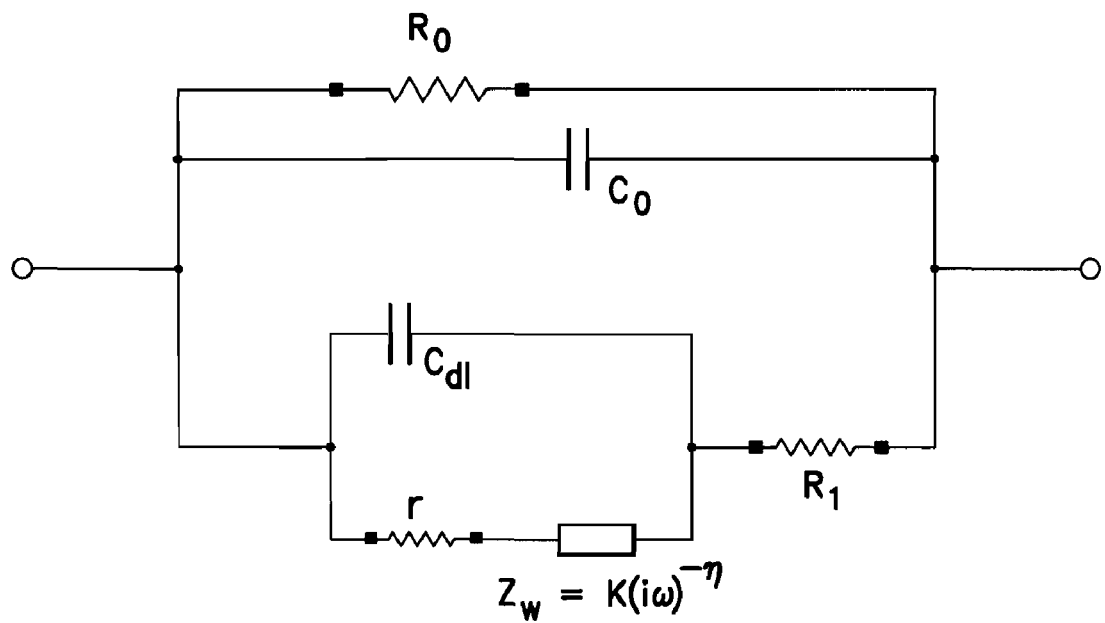

As represented on FIG. 13, the model can be utilized to interpret the electrical behavior of rocks containing metallic or clay particles. It includes an impedance zw which simulates the effects of the fractal rough pore interfaces between the conductive grains (metallic or clay minerals which are blocking the pore paths) and the electrolyte. This generalized Warburg impedance is in series with the resistance r of the blocking grains and both are shunted by the double layer capacitance Cdl. This combination is in series with the resistance of the electrolyte R1 in the blocked pore passages. The unblocked pore paths are represented by a resistance Ro which corresponds to the normal DC resistivity of the rock. The parallel combination of this resistance with the bulk sample capacitance Co is finally connected in parallel to the rest of the above-mentioned circuit.

Assuming the $e^{i\omega t}$ dependence, the complex electrical rock resistivity Z is defined as a function of chargeability, double-layer relaxation time, sample relaxation time, and grain percent resistivity (see equation (3))

$$Z = \frac{R_0}{1+i\omega\tau}\left[1 - m\left(1 - \frac{1}{1 + \frac{1}{\delta_1+\delta_2}(1+u)}\right)\right] \quad (3)$$

i. $m = \frac{R_0}{R_1 + R_0}$ (4)

$\tau_1 = rC_{dl}$ (5)

a. $\tau_2 = R_0 C_0$ (6)

$\delta_r = \frac{r}{R_0}$ (7)

$\delta_1 = \frac{r}{R_1+R_0} = m\delta_r$ (8)

$\delta_2 = \frac{K(i\omega)^{-\eta}}{R_1+R_0} = \frac{m}{R_0}K(i\omega)^{-\eta}$ (9)

a. $u = i\omega\tau\left(1 + \frac{\delta_2}{\delta_1}\right)$ (10)

where:

$\rho_0$ is the DC resistivity of the material (influenced by the rock porosity)

and $$m = \frac{\rho_0 - \rho_\infty}{\rho_0} = \frac{\rho_0}{\rho_0 + \rho_1}$$

is the chargeability parameter (relates to the low and high frequency asymptotes of the rock resistivity): strongly influenced by the rock's texture and;

$\tau_1 = rC_{dl}$ is the relaxation time constant related to the double-layer oscillations and influenced by the grain size and the type of the blocking minerals (normally metallic minerals or clay particles); and

K is the diffusivity of the charged ions in the electrolyte, which depends on the type and the concentration of ions present in the electrolyte; and $\eta$ is a parameter is directly related to the fractal geometry of the medium and is determined by the type and distribution of the mineral causing the low-frequency polarization; and $\tau_2 = R_0 C_0$ is the bulk time constant associated with the material as a whole, which depends on the rock fabric, the matrix properties and the total amount of water present in the rock; and $$\delta_r = \frac{r}{R_0}$$

is resistivity factor (or ratio) that relates the resistivity of the conductive grains with the DC resistivity value of the rock. Its value will be larger than unity for very good conductive grains and lower than unity for oxides.

This model, which can be used in one embodiment of the method of the invention, was tested over a wide range of frequencies against experimental data obtained for amplitude and phase of resistivity or conductivity as well as for the complex dielectric constant. The samples studied are those of sedimentary, metamorphic and igneous rocks.

Figure 14:
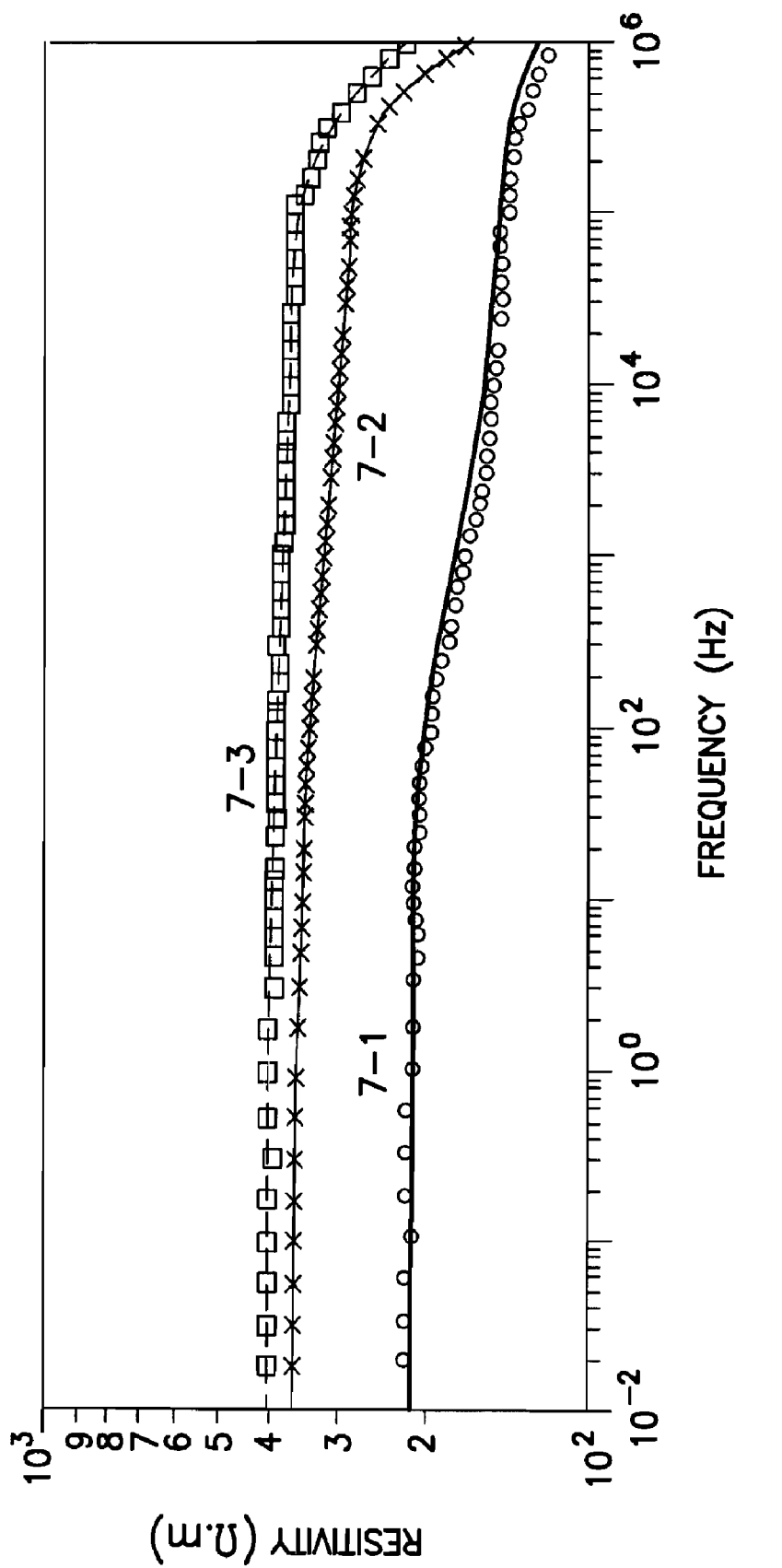
FIGS. 14 and 15 are experimental data fitted with the general complex resistivity model for various laboratory data (14) impedance versus frequency and (15) phase angle versus frequency.
Figure 15:
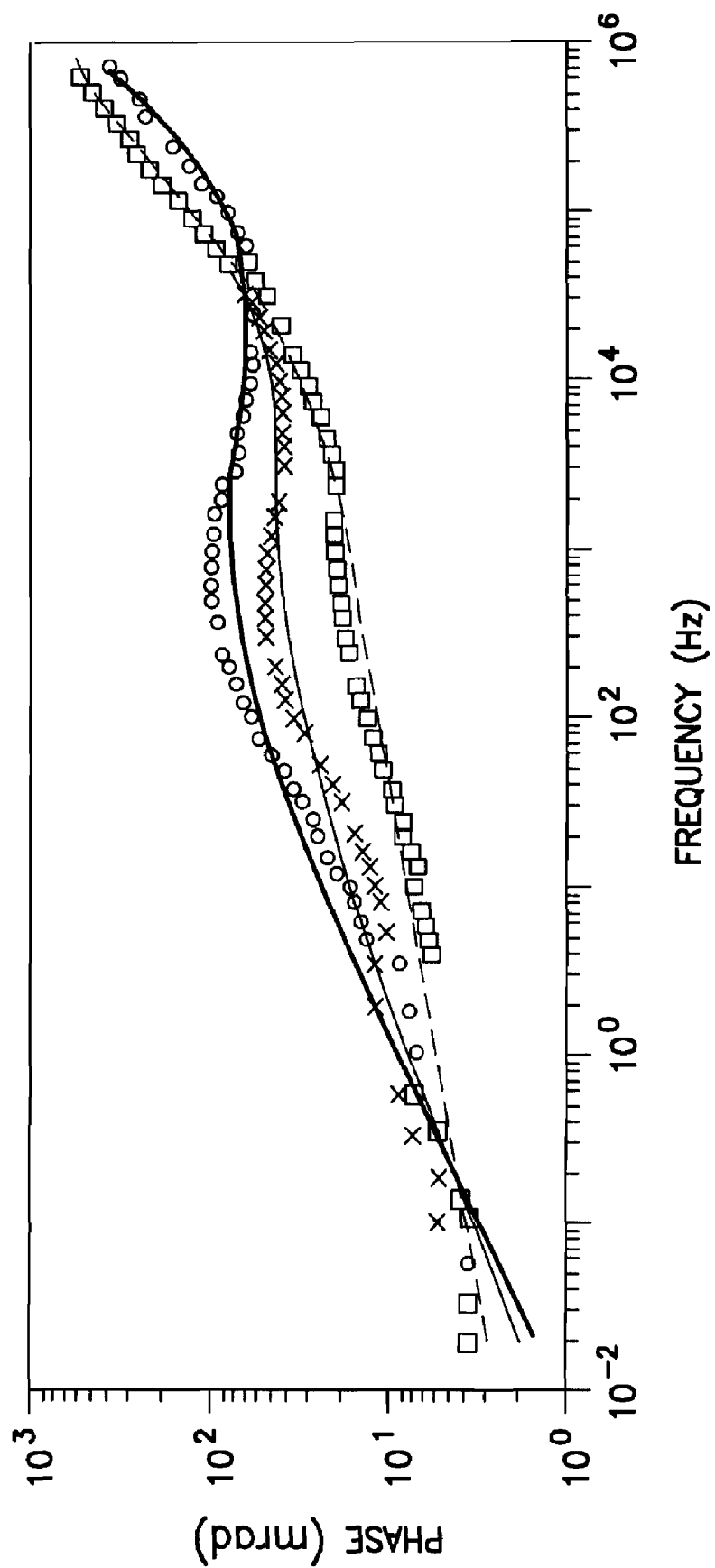

For demonstrative purposes some typical electrical data is shown in FIG. 14 featuring impedance versus frequency and on FIG. 15 showing phase angle versus frequency (straight lines are given by the model as opposed to dots and crosses that are experimental data). The model is capable of adequately reconstructing the experimental data in a wide frequency range. The inversion of the spectral complex resistivity data with the general model yields a number of model parameters, such as chargeability, double layer relaxation time, sample relaxation time, grain percent resistivity, etc. These parameters can be related to the petrophysical properties of interest.

Figure 16:
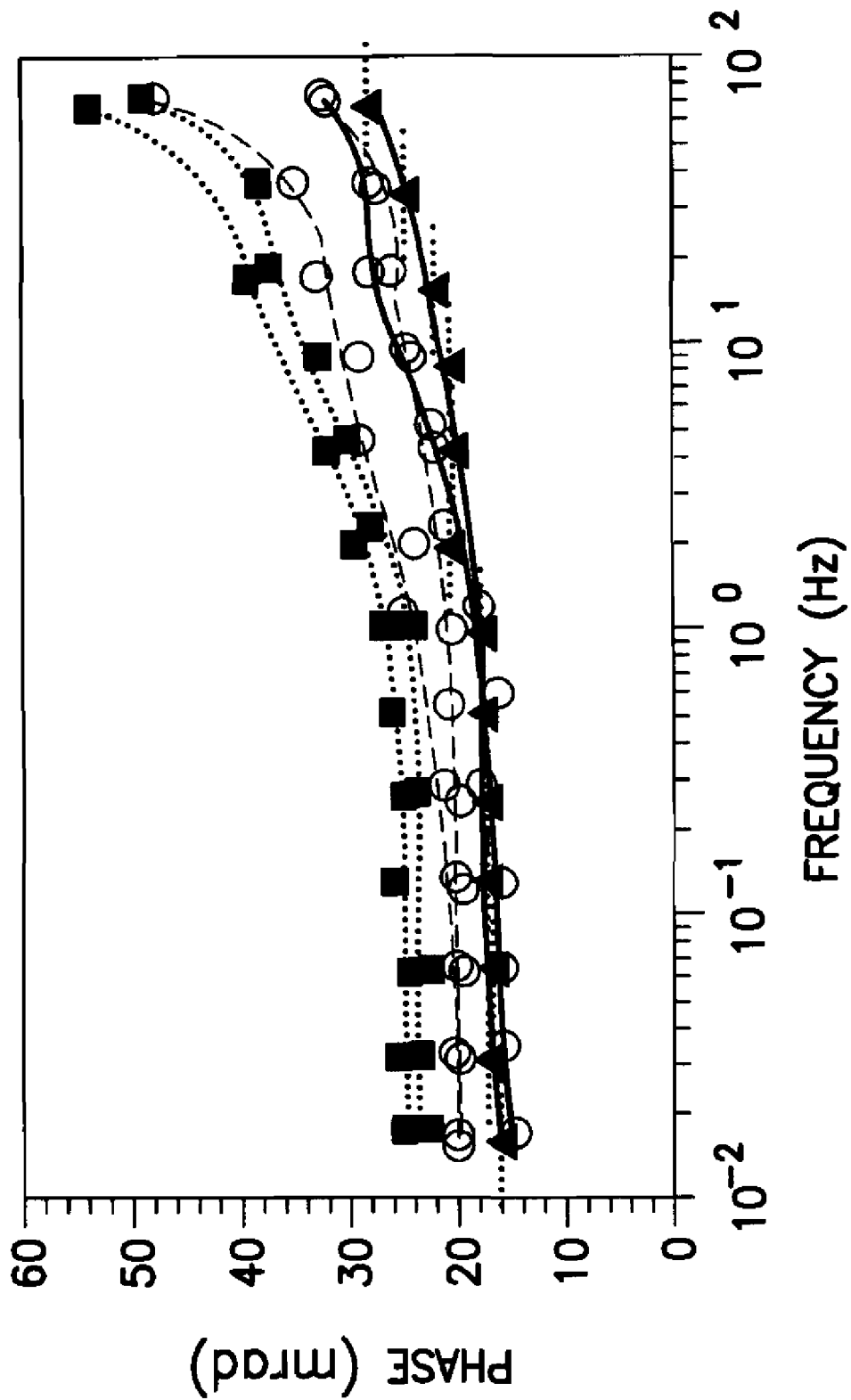
FIG. 16 is a graph of the field data fitted with the general complex resistivity model for the dependence of the phase angle on frequency.
Figure 17:
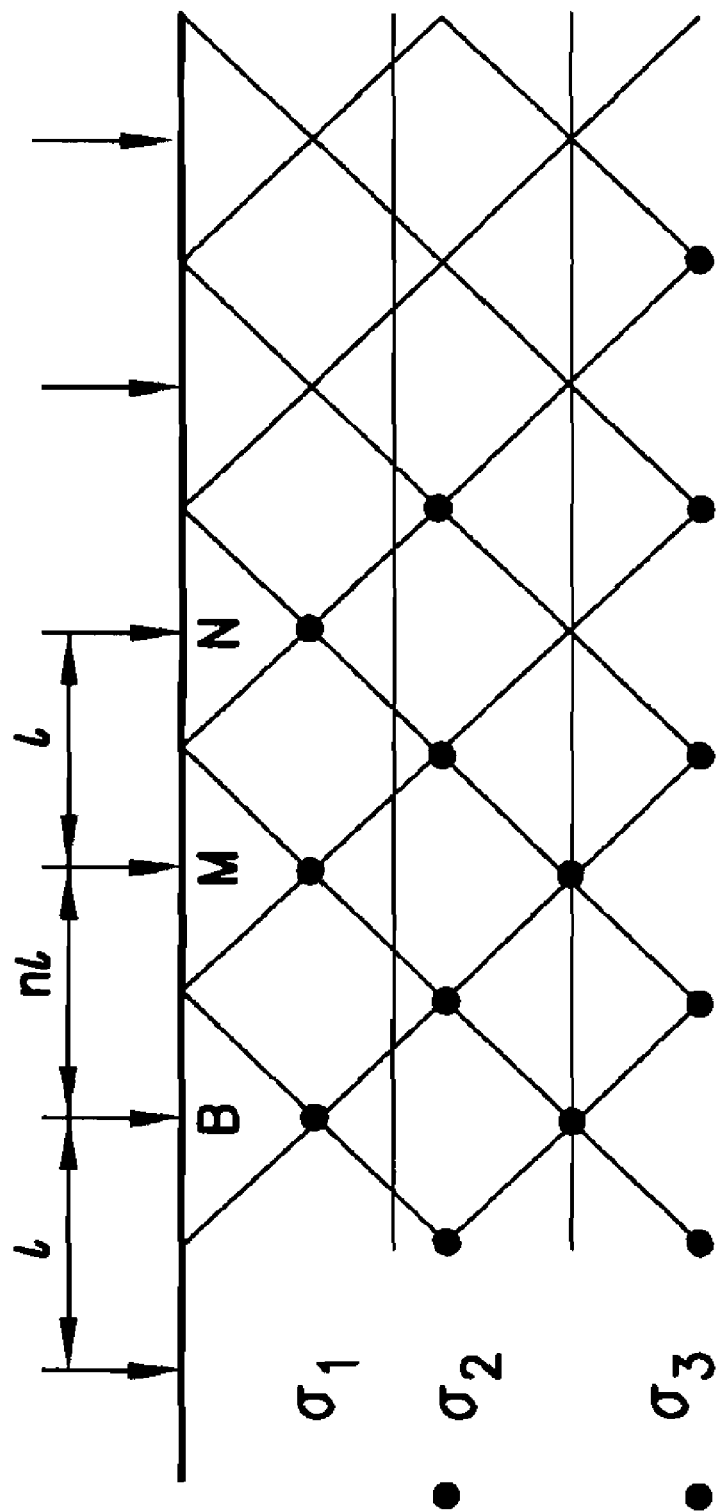
FIG. 17 is a diagram of a three-layered Earth.
Figure 18:
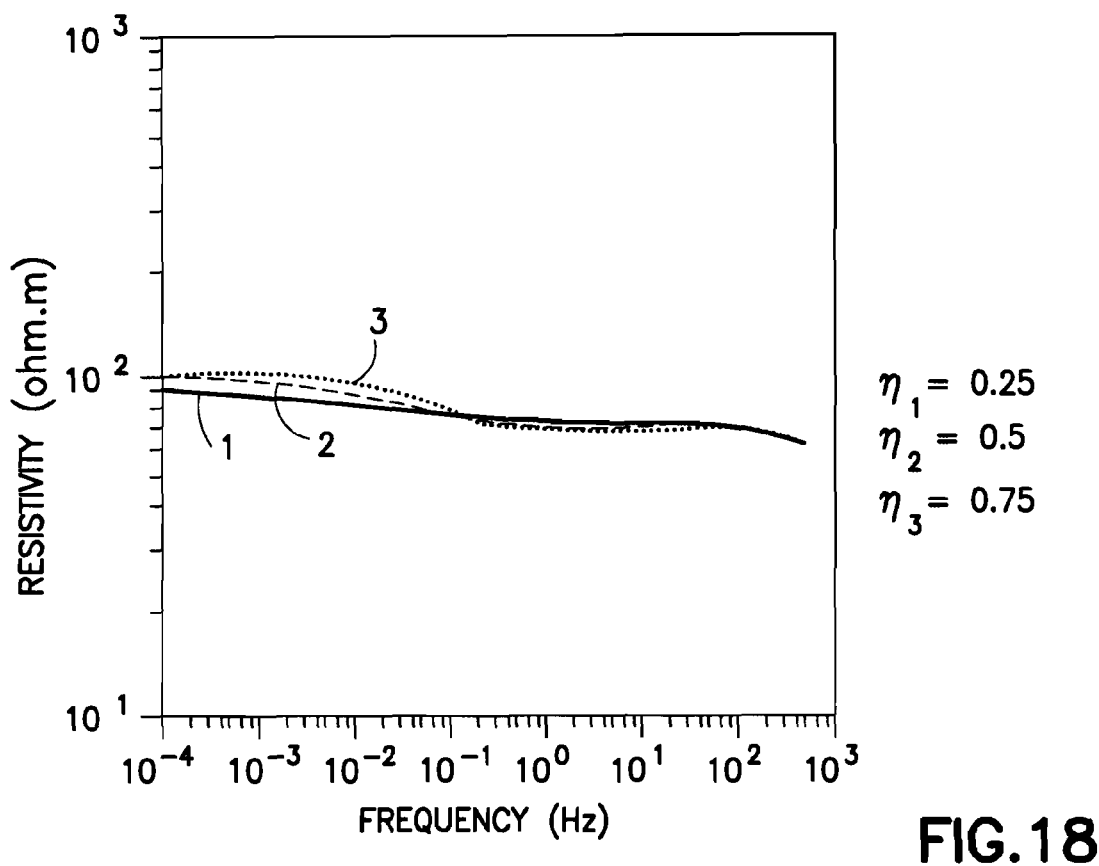
FIGS. 18 and 19 are graphs of impedance versus frequency and phase versus frequency respectively.
Figure 19:
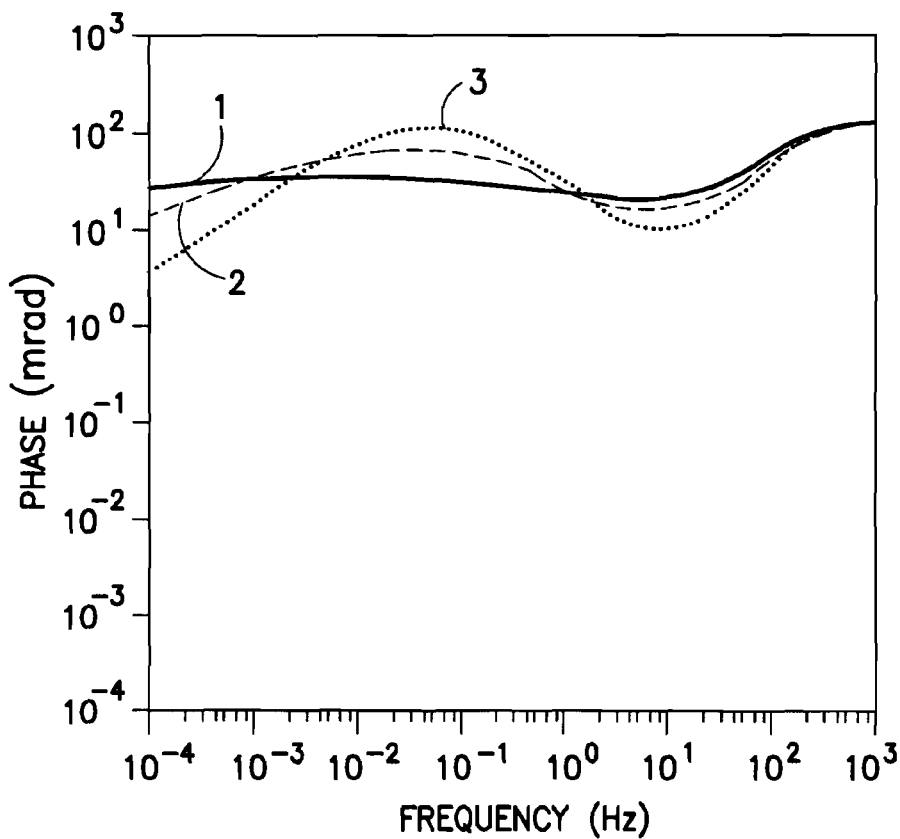

Experimental and fitted curves for the phase of complex resistivity for Jokisivu, Au deposit as shown in FIG. 16, see Vanhala, Heikki; Peltoniemi, Markku 1992. Spectral IP studies of Finnish ore prospects. Geophysics 57 (12), 1545-1555. The model is capable of adequately reconstructing the field data and, therefore, is suitable for the interpretation of the EM surveys In order to test if the fractal parameters could be observed (and, therefore, measured), the response was calculated for a three-layer Earth, in which the second layer is a polarizable medium, with the intrinsic electrical properties given by the fractal complex resistivity. FIG. 17 shows the layered Earth response for thickness of the overburden layer equal to 1 m. As shown in FIGS. 18 and 19 the phase is mainly affected by the parameters of the polarizable layer while the amplitude is more dependent on the combined layering. The value of the phase will be dependent on the layering, while the shape of the curve will be dependent on the fractal parameters. This indicates that it is possible to determine the parameters of the polarizable layer even in the presence of a thick overburden. For FIGS. 17 to 19:

$$\rho_0 = 100 \Omega m$$

$$m = 0.5$$

$$\tau = 10^{-6} s$$

$$\delta_r = 1.0$$

$$\tau_r = 10^{-3} s$$

$$\tau_0 = 10^{-12} s$$

Figure 20:
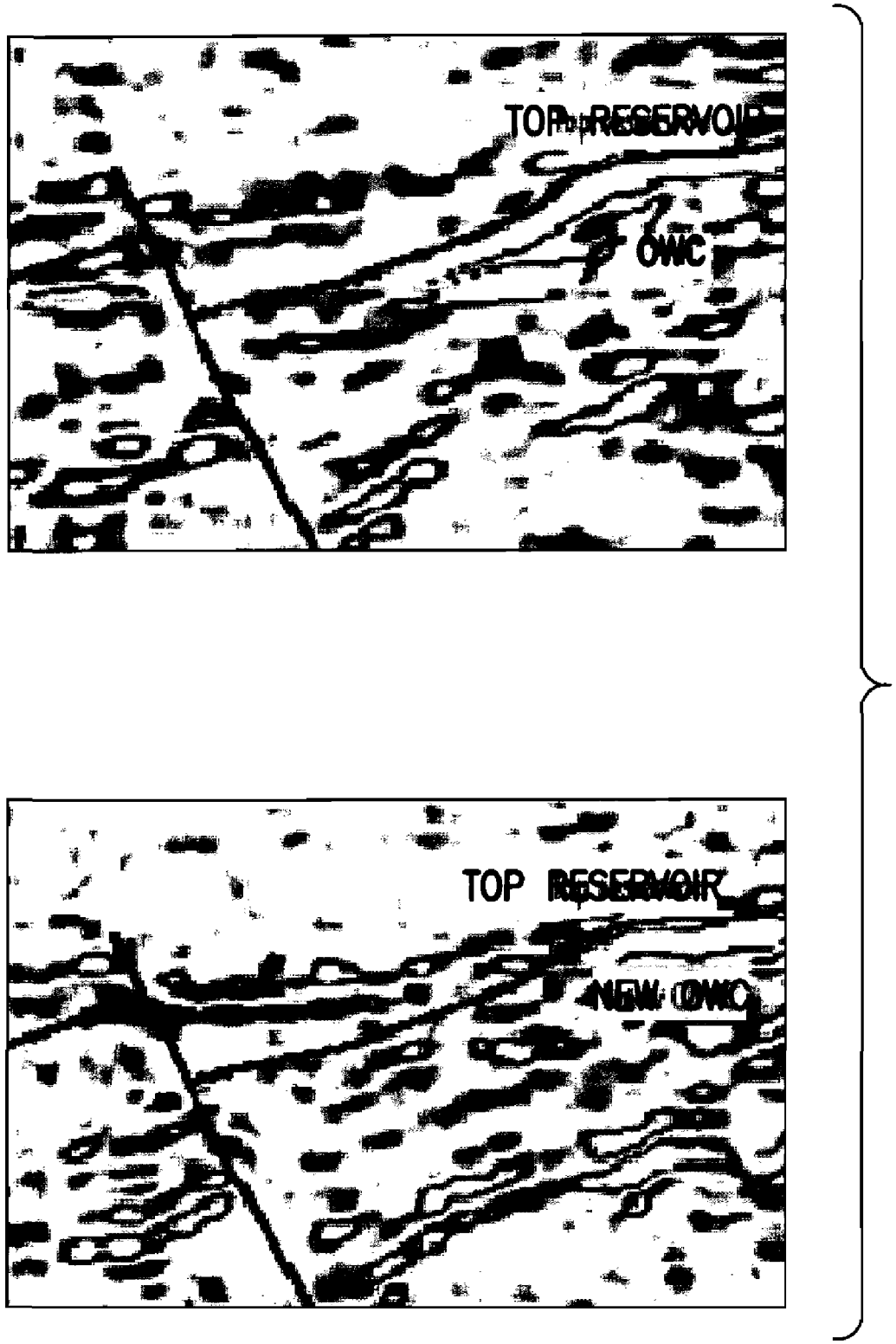
FIG. 20 is a depiction of a time lapse (4D) EM survey.
Figure 21:
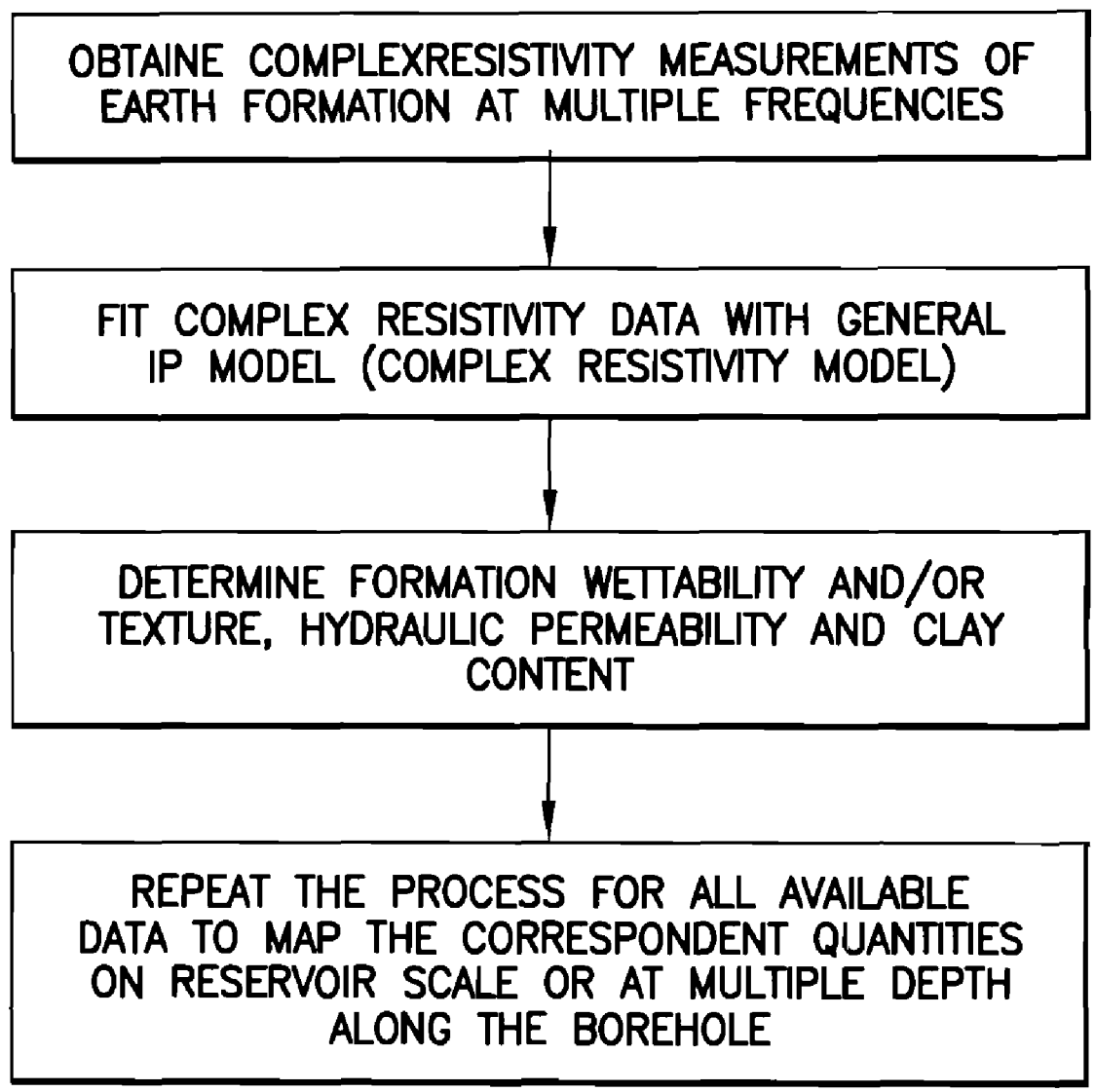
FIG. 21 is an interpretation workflow for multi-frequency data
Figure 22:
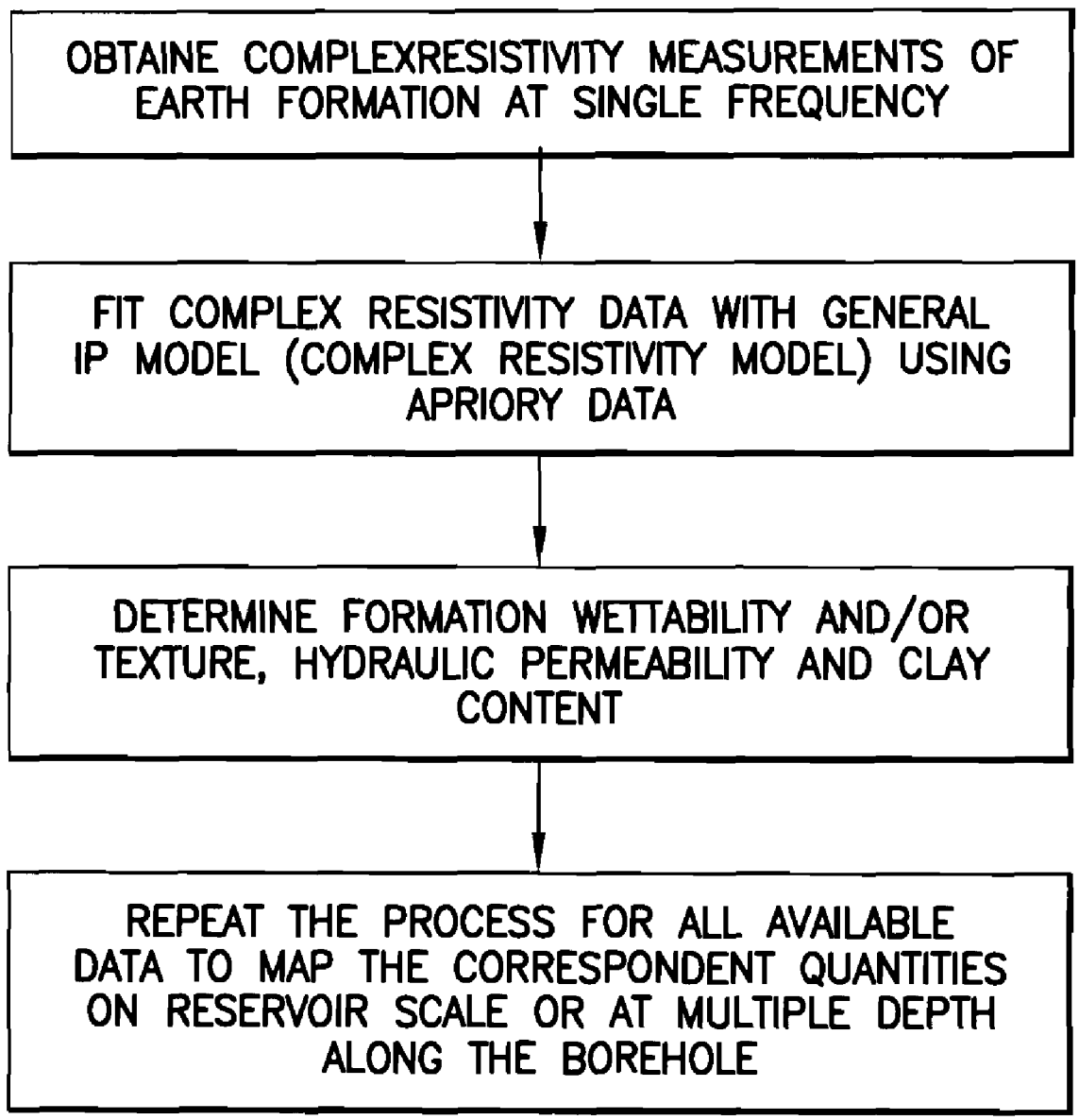
FIG. 22 is an interpretation workflow for a single-frequency data

Fields that undergo water-flooding often experience wettability changes. Time-lapse EM surveys mapping the imaginary part of the complex formation resistivity can help monitor such wettability changes (See FIG. 20). It can be difficult to map the movement of the flood front from only the real part of the complex formation resistivity (in case of low contrast in flooding water resistivity). According to the method of the invention, mapping of the imaginary component of the formation resistivity can help to improve mapping the waterflooded regions.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims. The method according to the invention could also be used for cross-well data that supplies the real and imaginary parts of the formation resistivity as a function of the coordinates and frequency can be used in a same way as the surface surveys.

What is claimed is:

1. A method for determining a reservoir formation properties comprising:
   i) exciting the reservoir formation with an electromagnetic exciting field;
   ii) measuring an electromagnetic signal produced by the electromagnetic exciting field in the reservoir formation;
   iii) extracting from the measured electromagnetic signal a spectral complex resistivity as a function of frequency;
   iv) fitting the spectral complex resistivity with an induced polarization model; and
   v) deducing the reservoir formation properties from the fitting with the induced polarization model.

2. The method according to claim 1, wherein the step of extracting the spectral complex resistivity from the measured electromagnetic signal comprises extracting the real and imaginary part of said complex resistivity.

3. The method according to claim 1, wherein the step of fitting the spectral complex resistivity with an induced polarization model comprises fitting the imaginary part of said spectral complex resistivity with said induced polarization model.

4. The method according to claim 3, wherein the reservoir formations properties comprises wettability of the reservoir formation.

5. The method according to claim 3 or 4, wherein the reservoir formation properties comprises one of clay content, rock texture or hydraulic permeability of the reservoir formation.

6. The method according to claim 1, wherein the step of exciting the reservoir formation comprises exciting the reservoir formation with an electromagnetic field at a plurality of frequencies.

7. The method according to claim 6, further comprising the step of repeating steps i) to v) for each of the plurality of frequencies in order to produce a map of the reservoir formation properties for a complete region of the reservoir formation.

8. The method according to claim 6, further comprising the step of repeating steps i) to v) for each of the plurality of frequencies in order to produce a map of the reservoir formation properties at multiple depths along a borehole drilled through the reservoir formation.

9. The method according to claim 1 further comprising the step of:
   vi) repeating steps i) to v) at various time intervals;
   vii) comparing the reservoir formation properties for the various time intervals in order to monitor changes in said reservoir formation properties as a function of time.

10. The method according to claim 9, wherein the reservoir formations properties comprises wettability of the reservoir formation and wherein the step of comparing the reservoir formation properties for the various time intervals allows to map movement of a flood front into the reservoir formation.

11. A computer-implemented method for determining a reservoir formation properties, said method comprising:
    i) acquiring in a computer software program an electromagnetic signal received from a electromagnetic tool;
    ii) extracting from the measured electromagnetic signal a spectral complex resistivity as a function of frequency;
    iii) fitting the spectral complex resistivity with an induced polarization model; and
    iv) deducing the reservoir formation properties from the fitting with the induced polarization model.

12. A method for determining the wettability of a reservoir formation comprising the steps of:
    i) exciting the reservoir formation with an electromagnetic exciting field;
    ii) measuring an electromagnetic signal produced by the electromagnetic exciting field in the reservoir formation;
    iii) extracting from the measured electromagnetic signal a spectral complex resistivity as a function of frequency;
    iv) extracting the imaginary part from the spectral complex resistivity;
    v) deducing the wettability of the reservoir formation from said extracted imaginary part.

13. The method according to claim 12, wherein the step of exciting the reservoir formation comprises exciting the reservoir formation with an electromagnetic field at a plurality of frequencies.

14. The method according to claim 13, further comprising the step of repeating steps i) to v) for each of the plurality of frequencies in order to produce a map of the wettability of the reservoir formation for a complete region of said reservoir formation.

15. The method according to claim 13, further comprising the step of repeating steps i) to v) for each of the plurality of frequencies in order to produce a map of the wettability of the reservoir formation at multiple depths along a borehole drilled through the reservoir formation.

16. The method according to claim 12 further comprising the step of:

vi) repeating steps i) to v) at various time intervals;
vii) comparing the wettability of the reservoir formation for the various time intervals in order to monitor changes in said reservoir formation properties as a function of time.

* * * * *